United States Patent [19]
Madour et al.

[11] Patent Number: 6,070,080
[45] Date of Patent: May 30, 2000

[54] CALLED PARTY AVAILABILITY ANNOUNCEMENT IN A RADIO TELECOMMUNICATIONS NETWORK

[75] Inventors: Lila Madour, Verdun; Michel Houde, St-Laurent, both of Canada

[73] Assignee: Telefonaktiebolaget LM Ericsson (publ), Stockholm, Sweden

[21] Appl. No.: 08/804,252

[22] Filed: Feb. 21, 1997

Related U.S. Application Data

[60] Provisional application No. 60/031,693, Nov. 22, 1996.

[51] Int. Cl.[7] .................................................. H04Q 7/20
[52] U.S. Cl. ......................... 455/458; 455/417; 379/229; 379/230
[58] Field of Search .................................. 455/417, 445, 455/459, 558, 414, 458, 433, 528, 413, 418, 67.7, 421, 461; 379/88.06, 219, 220, 207, 229, 230, 235, 243, 251, 252, 257, 258, 265; 370/328, 322, 410

[56] References Cited

U.S. PATENT DOCUMENTS

| | | | |
|---|---|---|---|
| 4,809,321 | 2/1989 | Morganstein et al. | 379/211 |
| 5,255,314 | 10/1993 | Applegate et al. | 379/212 |
| 5,259,021 | 11/1993 | Antilla et al. | 455/528 |
| 5,329,578 | 7/1994 | Brennan et al. | 455/445 |
| 5,353,331 | 10/1994 | Emery et al. | 455/414 |
| 5,440,615 | 8/1995 | Caccuro et al. | 379/67 |
| 5,485,632 | 1/1996 | Ng et al. | 455/51.2 |
| 5,497,412 | 3/1996 | Lannen et al. | 455/408 |
| 5,564,068 | 10/1996 | Nguyen | 455/433 |
| 5,579,375 | 11/1996 | Ginter | 455/433 |
| 5,703,930 | 12/1997 | Miska et al. | 379/57 |
| 5,758,281 | 5/1998 | Emery et al. | 455/428 |
| 5,812,639 | 9/1998 | Bartholomew et al. | 379/230 |
| 5,838,779 | 11/1998 | Fuller et al. | 455/417 |
| 5,839,064 | 11/1998 | Foti | 455/445 |
| 5,884,180 | 3/1999 | Bertacchi | 455/458 |

*Primary Examiner*—Dwayne D. Bost
*Assistant Examiner*—Jean A. Gelin
*Attorney, Agent, or Firm*—Smith & Danamraj, P.C.

[57] ABSTRACT

A method of announcing to a calling party in an originating system in a radio telecommunications network that a called party in a serving system is not available. The method begins by sending a Routing Request (RoutReq) Invoke message from the originating system to the serving system. The RoutReq Invoke message includes a Transaction Capabilities parameter indicating that the originating system is capable of generating announcements. The serving system then determines that the called party is not available. This is followed by sending a Redirection Request (RedReq) Invoke message from the serving system to the originating system. The RedReq Invoke message includes an Announcement List parameter requesting the originating system to provide an announcement to the calling party, and may include a Preferred Language parameter. The RedReq Invoke message also includes an Allow Transfer to Number parameter if the called party subscribes to services requiring service logic support. Any trunk seized from the originating system to the serving system is then released. Finally, the originating system sends the announcement to the calling party announcing that the called party is not available. If a preferred language parameter was received, the originating system makes the announcement in the preferred language indicated.

22 Claims, 7 Drawing Sheets

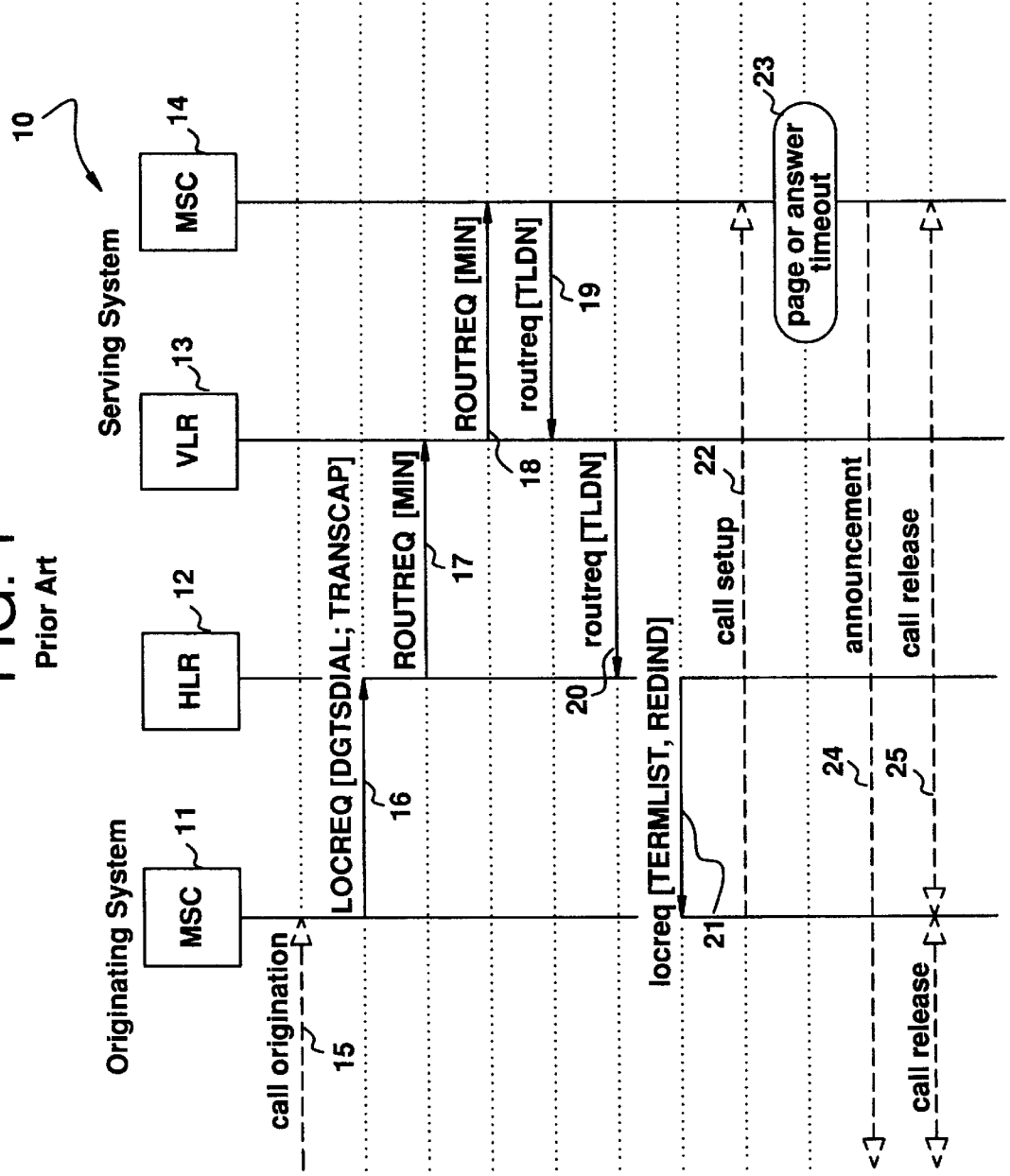

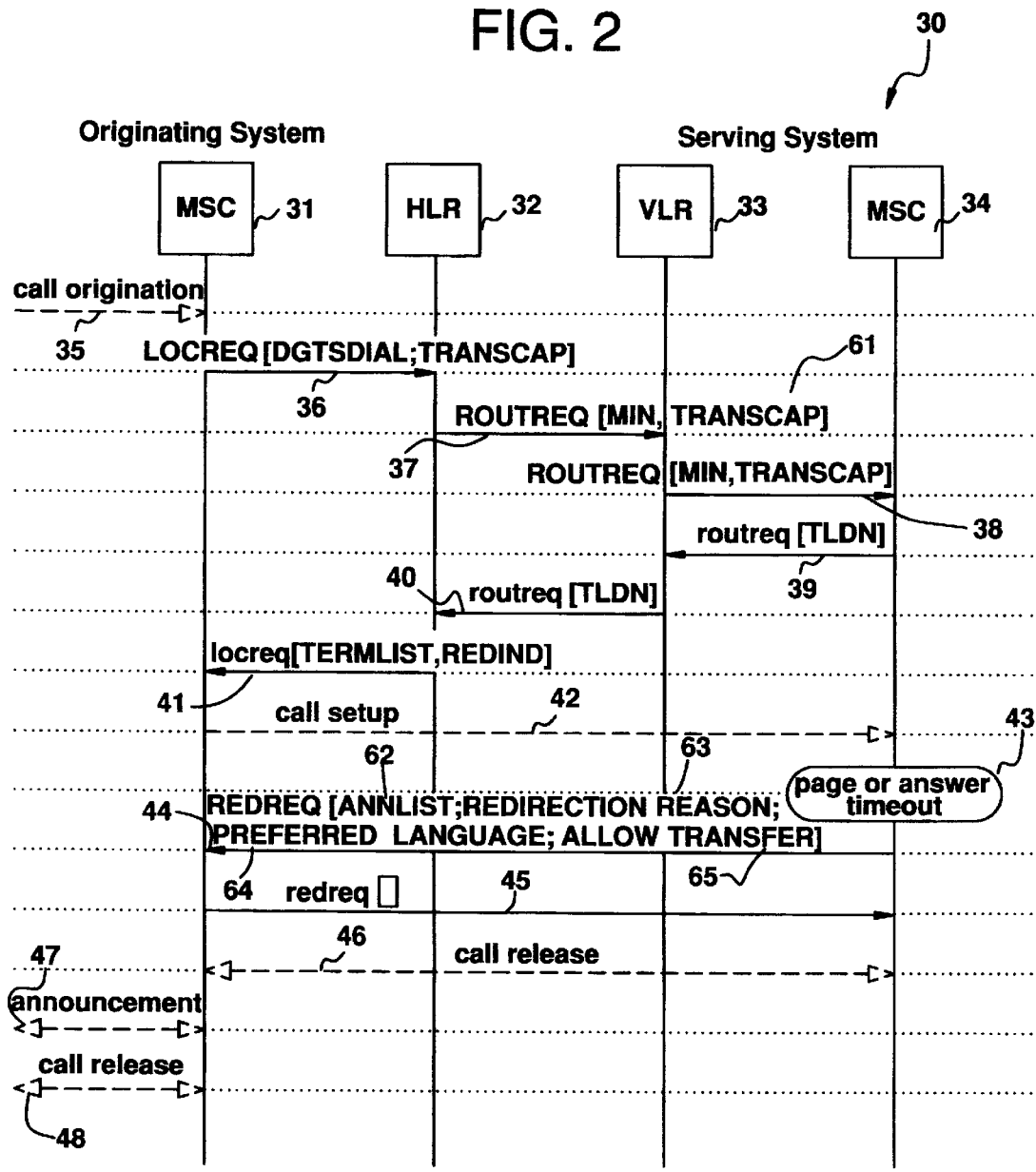

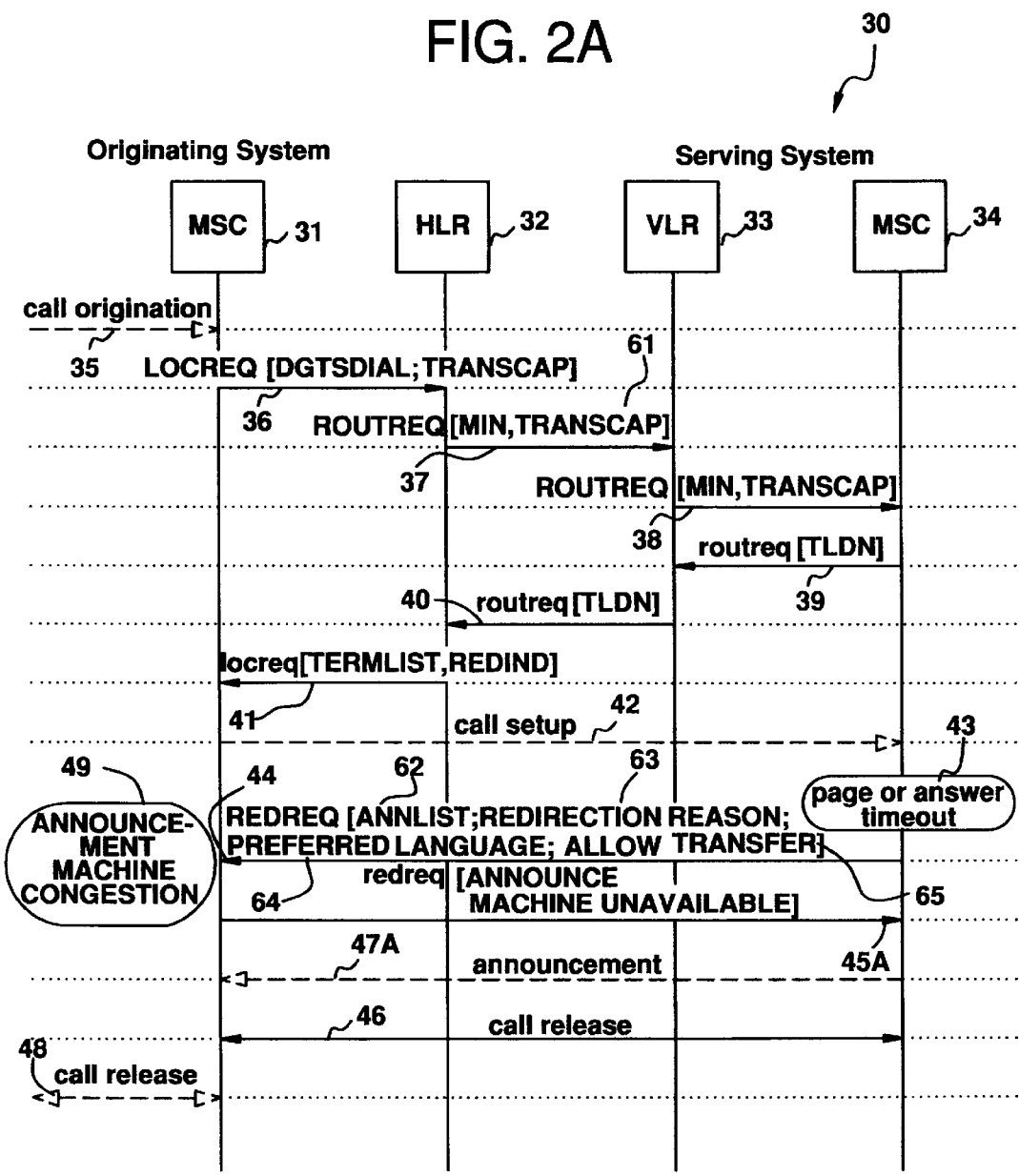

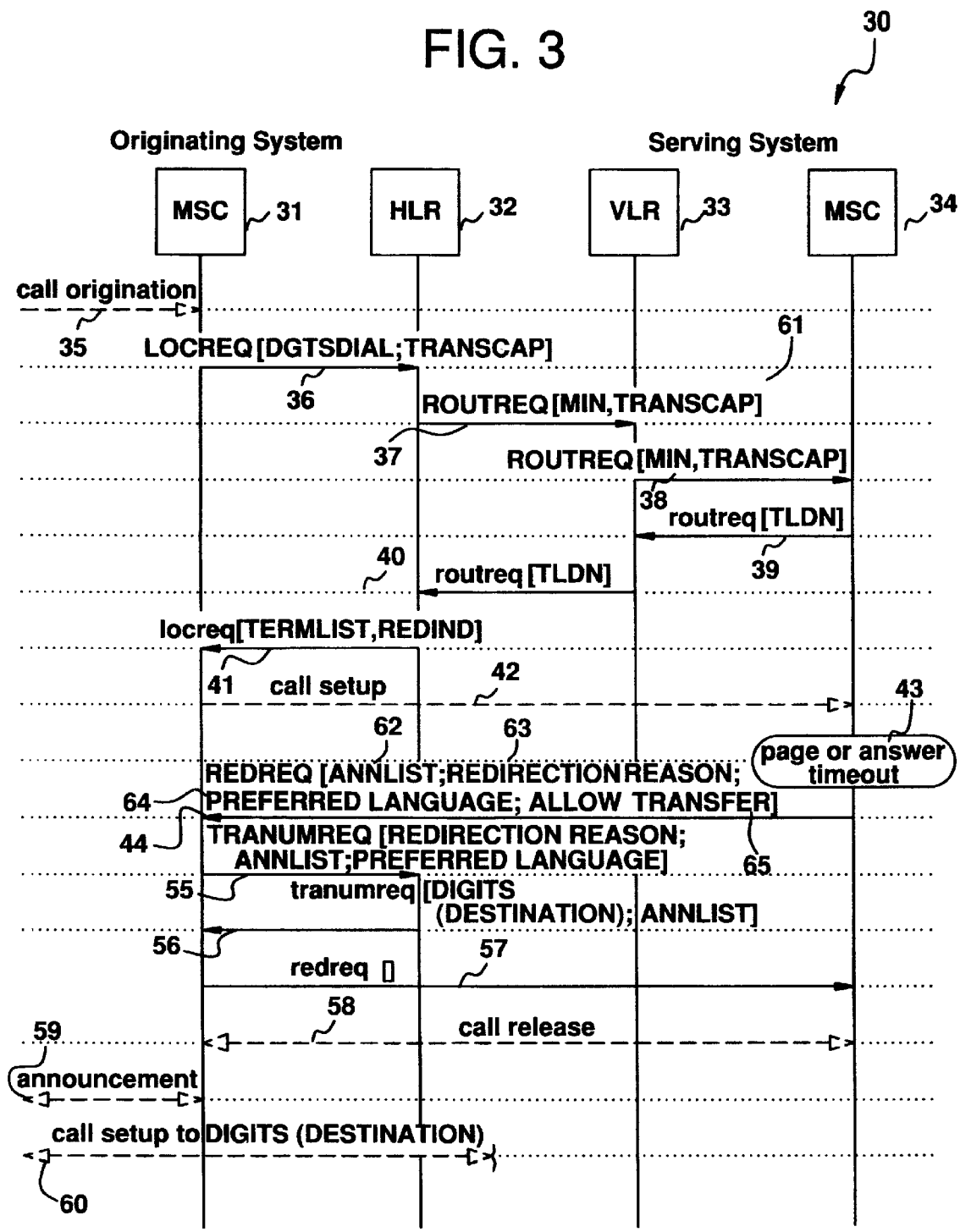

FIG. 4

| RoutingRequest INVOKE Parameters | | | Timer: RRT | |
|---|---|---|---|---|
| Field | Value | Type | Reference | Notes |
| Identifier | SET[NATIONAL 18] | M | 6.4.1.2 | |
| Length | variable octets | M | 6.4.1.1 | |
| Contents | | | | |
| BillingID (Originating) | | M | 6.5.2.16 | a |
| ElectronicSerialNumber | | M | 6.5.2.63 | |
| MobileIdentificationNumber | | M | 6.5.2.81 | |
| MSCID (Originating MSC) | | M | 6.5.2.82 | |
| SystemMyTypeCode (Originating MSC) | | M | 6.5.2.147 | |
| AlertCode | | O | 6.5.2.3 | b |
| CallingPartyNumberString1 | | O | 6.5.2.23 | c |
| CallingPartyNumberString2 | | O | 6.5.2.24 | c |
| CallingPartySubaddress | | O | 6.5.2.25 | c |
| DestinationDigits | | O | 6.5.2.56 | d,e |
| DMH_AccountCodeDigits | | O | 6.5.2.59 | f |
| DMH_AlternateBillingDigits | | O | 6.5.2.60 | f |
| DMH_BillingDigits | | O | 6.5.2.61 | f |
| LegInformation | | O | 6.5.2.75 | g |
| LocationAreaID | | O | 6.5.2.77 | f,h |
| MobileDirectoryNumber | | O | 6.5.2.80 | f |
| MSCIdentificationNumber | | O | 6.5.2.83 | i |
| OneTimeFeatureIndicator | | O | 6.5.2.88 | j |
| NoAnswerTime | | O | 6.5.2.87 | k |
| PC_SSN (Originating MSC) | | O | 6.5.2.93 | l |
| PilotBillingID | | O | 6.5.2.94 | m |
| PilotNumber | | O | 6.5.2.95 | m |
| RedirectingNumberString | | O | 6.5.2.108 | c |
| RedirectingSubaddress | | O | 6.5.2.109 | c |
| SenderIdentificationNumber | | O | 6.5.2.116 | n |
| TerminationTreatment | | O | 6.5.2.158 | o |
| TerminationTriggers | | O | 6.5.2.159 | f |
| TransactionCapability | | O | 6.5.2.160 | r |
| VoiceMailboxNumber | | O | 6.5.2.165 | p |
| VoiceMailboxPIN | | O | 6.5.2.166 | q |

FIG. 5

| Field | Value | Type | Reference | Notes |
|---|---|---|---|---|
| Identifier | TransactionCapability IMPLICIT OCTET STRING | M | 6.5.1.2 | |
| Length | variable octets | M | 6.5.1.1 | |
| Contents | | | | |

| H | G | F | E | D | C | B | A | octet | Notes |
|---|---|---|---|---|---|---|---|---|---|
| Reserved | Reserved | Reserved | SPINI | RUI | ANN | BUSY | PROF | 1 | |
| Reserved | Reserved | ANN | TL | Multiple Terminations | | | | 2 | a |
| ••• | | | | | | | | n | a,b |

FIG. 6

| RedirectionRequest INVOKE Parameters | | | | Timer: RDRT |
|---|---|---|---|---|
| Field | Value | Type | Reference | Notes |
| Identifier | SET[NATIONAL 18] | M | 6.4.1.2 | |
| Length | variable octets | M | 6.4.1.1 | |
| Contents | | | | |
| BillingID (Originating) | | M | 6.5.2.16 | |
| ElectronicSerialNumber | | M | 6.5.2.63 | |
| MobileIdentificationNumber | | M | 6.5.2.81 | |
| RedirectionReason | | M | 6.5.2.110 | |
| AnnouncementList | | O | 6.5.2.6 | c |
| LegInformation | | O | 6.5.2.75 | a |
| MSCIdentificationNumber | | O | 6.5.2.83 | b |
| Preferred Language | | O | | |
| AllowTransferToNumber | | O | | |

FIG. 7

| Field | Value | Type | Reference | Notes |
|---|---|---|---|---|
| Identifier | Allow Transfer To Number | M | 6.5.1.2 | |
| Length | 1 Octet | M | 6.5.1.1 | |
| Contents | | | | |

| H | G | F | E | D | C | B | A | Octet | Notes |
|---|---|---|---|---|---|---|---|---|---|
| Reserved | | | | | | | ATN | 1 | |

FIG. 8

| TransferToNumberRequest INVOKE Parameters | | | Timer: TTNRT | |
|---|---|---|---|---|
| Field | Value | Type | Reference | Notes |
| Identifier | SET[UNIVERSAL 17] | M | 6.4.1.2 | |
| Length | variable octets | M | 6.4.1.1 | |
| Contents | | | | |
| ElectronicSerialNumber | | M | 6.5.2.63 | |
| MobileIdentificationNumber | | M | 6.5.2.81 | |
| RedirectionReason | | M | 6.5.2.110 | |
| SystemMyTypeCode (MSC) | | M | 6.5.2.147 | |
| BillingID (Originating) | | O | 6.5.2.16 | a |
| GroupInformation | | O | 6.5.2.69 | b |
| LegInformation | | O | 6.5.2.75 | c |
| AnnouncementList | | O | 6.5.2.6 | |
| Preferred Language | | O | | |
| MSC-ID (Originating MSC) | | O | | |
| MSCIdentificationNumber | | O | 6.5.2.83 | |
| PilotBillingID | | O | 6.5.2.94 | |
| PilotNumber | | O | 6.5.2.95 | |
| TransactionCapability | | O | 6.5.2.160 | |

CALLED PARTY AVAILABILITY ANNOUNCEMENT IN A RADIO TELECOMMUNICATIONS NETWORK

This application claims the benefit of U.S. Provisional No. 60/031,693 filed Nov. 22, 1996.

BACKGROUND OF THE INVENTION

1. Technical Field of the Invention

This invention relates to radio telecommunication systems and, more particularly, to a system and method of announcing the availability of a called party.

2. Description of Related Art

Whenever an attempt is made to deliver a call to a called party, and there is no answer, there is no page response, the call is aborted, or there is some other reason that the call cannot be delivered, prior systems generated an announcement from the mobile switching center (MSC) serving the called party (the serving system) to the calling party telling him that the call cannot be delivered and, if possible, providing a reason for non-delivery. To do this, prior systems seize a trunk all the way from the serving system to the originating system to deliver this announcement. This can be extremely expensive to the system operator, and ties up valuable network resources. It can be expensive for the subscriber as well, since some cellular operators charge subscribers for long distance announcements from the serving system to the originating system.

An additional problem arises because some cellular operators do not allow internal trunks in the Public Land Mobile Network (PLMN) to be utilized for such announcements. Instead, Public Switched Telephone Network (PSTN) trunks, which are very expensive and often congested, must be utilized in that instance. Oftentimes, a calling party is kept waiting up to 20 seconds or more, and then receives a congestion signal.

When several callers from several originating systems try to call the subscriber in the serving system at or near the same time, and the calls cannot be delivered, then multiple trunks must be seized in order to carry announcements from the serving system to the multiple originating systems. In addition, an announcement machine is required in the serving system for each announcement. Thus, when multiple announcements must be made at the same time, multiple announcement machines are required. However, many operators cannot afford to purchase and operate a large number of announcement machines. Therefore, they may purchase only a few machines. The announcement machines are used to send all kinds of announcements, therefore, there may be an insufficient number of machines to send announcements to all calling parties. In that case, some of the calling parties receive only a congestion signal, with no explanation.

There are no known prior art teachings of a solution to the aforementioned deficiency and shortcoming such as that disclosed herein.

In order to overcome the disadvantage of prior systems which make announcements to the calling party from the serving system, it would be advantageous to have a system and method which announces the availability of a called party from the originating system. In an alternative embodiment, the announcement may be made from the serving system if the originating system's announcement machines are congested. Such a system provides for better usage of trunk circuits between originating and serving MSCs; better call treatment (i.e., fewer congestion tones after call setup); reduced announcement machine congestion; and reduced costs to the operator due to non-billable calls, since the trunk between the serving system and the originating system is preferably not utilized to deliver the announcement. The present invention provides such a system and method.

SUMMARY OF THE INVENTION

In one aspect, the present invention is a method in a radio telecommunications network, of announcing to a calling party in an originating system that a called party in a serving system is not available. The method begins by sending a message from the originating system to the serving system indicating that the originating system is capable of generating announcements. The serving system then determines that the called party is not available. This is followed by sending a message from the serving system to the originating system requesting the originating system to provide an announcement to the calling party. If a trunk has been seized between the originating system and the serving system, it is then released. This is followed by sending an announcement from the originating system to the calling party announcing that the called party is not available.

In a complementary aspect, the present invention is a method of passing a preferred language indicator of the called party from a serving system in a radio telecommunications network to an announcing system in an originating system. The method may be added to the method above for announcing to a calling party in an originating system that a called party in a serving system is not available. The serving system sends a message to the originating system passing a preferred language indicator to the originating system. The preferred language indicator indicates a preferred language for the announcement, and the originating system then sends the announcement utilizing the preferred language of the called party. If a preferred language is not available, the originating system utilizes a default language. For example, for a call origination from the PSTN, the system utilizes the calling party's preferred language retrieved from Integrated Services User Part (ISUP) signaling or other equivalent means. For call origination from a mobile station, the system utilizes the preferred language retrieved from the calling party's subscriber profile.

In another aspect, the present invention is a method of passing from the serving system to the originating system, the detailed reasons for non-delivery of an incoming call to a mobile station. A parameter such as, for example Announcement List (optional), may be utilized in addition to the mandatory and less detailed Redirection Reason. The method may be added to the method above for announcing to a calling party in an originating system that a called party in a serving system is not available. The serving system sends a message to the originating system with a detailed reason for non-delivery.

In yet another aspect, the present invention is a method of providing the originating system with an indication of the need for the originating system to request value added services from service logic in, for example a home location register (HLR) or Service Control Point (SCP), due to non-delivery of a call. The originating system relays to the service logic the reason (or detailed reason) for non-delivery of the call. The method may be added to the method above for announcing to a calling party in an originating system that a called party in a serving system is not available. The originating system sends a message to the service logic stating the reason or detailed reason for non-delivery.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 1 (Prior Art) is a message flow diagram illustrating the messages involved in call delivery invocation in a system that does not support page before routing, and no answer or no page response is received from the called mobile station, thereby generating an announcement to the calling party from the serving system in a prior art telecommunications network;

FIG. 2 is a message flow diagram illustrating the messages involved in call delivery invocation in a network that does not support page before routing, and no answer or no page response is received from the called mobile station, thereby generating an announcement to the calling party from the originating system in accordance with the teachings of the present invention;

FIG. 2A is a message flow diagram of an alternative embodiment of the message flow illustrated in FIG. 2;

FIG. 3 is a message flow diagram illustrating the messages involved in call delivery invocation in a network that does not support page before routing, the called mobile station subscribes to services that require service logic, and no answer or no page response is received from the called mobile station, thereby generating an announcement to the calling party from the originating system in accordance with the teachings of the present invention;

FIG. 4 is a table of parameters for the Routing Request Invoke message modified in accordance with the teachings of the present invention;

FIG. 5 is a table illustrating the contents of the Transaction Capability parameter of the Location Request Invoke message and the Routing Request Invoke message of FIG. 4;

FIG. 6 is a table of parameters for the Redirection Request Invoke message modified in accordance with the teachings of the present invention;

FIG. 7 is a table illustrating the contents of the Allow Transfer to Number parameter of the Redirection Request Invoke message of FIG. 6; and FIG. 8 is a table of parameters for the Transfer to Number Request Invoke message modified in accordance with the teachings of the present invention.

DETAILED DESCRIPTION OF EMBODIMENTS

FIG. 1 is a message flow diagram illustrating the messages involved in call delivery invocation in a network that does not support page before routing, and no answer or no page response is received from the called mobile station, thereby generating an announcement to the calling party from the serving system in a prior art telecommunications network. A radio telecommunications network 10 is shown to comprise an originating system having an originating MSC 11 and a Home Location Register (HLR) 12, and a serving system having a Visitor Location Register (VLR) 13 and a serving MSC 14. A mobile station (MS) (not shown) belonging to a called subscriber is operating within the service area of the serving MSC 14.

A call origination 15 is first received in the originating MSC 11. The originating MSC 11 sends a Location Request (LocReq) Invoke message 16 to the HLR 12 and includes the digits dialed and a Transaction Capabilities (TransCap) parameter. The HLR 12 associates the digits dialed with a Mobile Identification Number (MIN) and includes the MIN in a Routing Request (RoutReq) Invoke message 17 sent to the VLR 13. At 18, the VLR forwards the RoutReq Invoke message to the serving MSC 14. The serving MSC then sends a RoutReq Return Result message 19 to the VLR 13, and includes a Temporary Location Directory Number (TLDN). At 20, the VLR forwards the RoutReq Return Result message to the HLR 12. The HLR then sends a LocReq Return Result message 21 to the originating MSC 11 with instructions for call setup.

At 22, a trunk is seized and the call is set up between the originating MSC 11 and the serving MSC 14. At 23, it is determined that the called subscriber is not available, either because there was no page response from the called mobile station, or the called party did not answer when an alert signal was sent to the called mobile station. An announcement 24 is then generated by the serving MSC 14 and is carried over the voice trunk to the calling party. This is followed by call release 25 at which time the trunk is released.

There are many reasons that a call cannot be delivered, and an announcement is required. For example, the called mobile station may not respond to the page, or may disconnect from the serving MSC after the routing signals have been sent, but before call setup is complete. In each case that a call cannot be delivered, prior art systems generate the announcement at the serving system and tie up a trunk to the originating system to deliver the announcement.

The present invention utilizes the Redirection Request message to provide an indication to the originating system that the call cannot be delivered, and to indicate the reason for non-delivery. The originating system then delivers an announcement to the calling party providing the reason that the call could not be delivered.

Some telecommunications networks utilize a scheme of paging the called mobile station before a trunk is seized and the call is routed. When there is no page response in these networks, the originating system receives an indication of no page response in the Routing Request Return Result message from the serving system. At that time, an announcement may be generated and sent to the calling party by the originating system. Other instances in which the present invention may be utilized include voice channel congestion, detection of a fraudulent access, radio transmission loss, unavailable line terminal, serving system congestion, and unavailable roaming number.

FIG. 2 is a message flow diagram illustrating the messages involved in call delivery invocation in a network that does not support page before routing, and no answer or no page response is received from the called mobile station, thereby generating an announcement to the calling party from the originating system in accordance with the teachings of the present invention. The present invention adds parameters in existing IS-41 messages to achieve the desired functionality. The IS-41 intersystem signaling standard is hereby incorporated by reference herein.

In general, the present invention adds a transaction capabilities (Transcap) parameter in the Routing Request (RoutReq) Invoke message between the HLR and ultimately the serving MSC. The Transcap parameter indicates to the serving system that the originating system is capable of generating tones and announcements. If so, and the call cannot be delivered because, for example, there is a timeout for no page response or no answer from the called party, the serving system sends a Redirection Request (RedReq)

Invoke message to the originating MSC. In the present invention, the serving system includes the parameters Announcement List (Annlist), Preferred Language, and Allow Transfer to Number in the RedReq Invoke message requesting that the originating system provide an announcement to the calling party and selecting which announcement is to be played. The RedReq Invoke message is sent to the originating system which sends back a RedReq Return Result message, releases the trunk to the serving system, plays the announcement to the calling party, and releases the call.

Referring to FIG. 2 in detail, a radio telecommunications network 30 is shown to comprise an originating system having an originating MSC 31 and a Home Location Register (HLR) 32, and a serving system having a Visitor Location Register (VLR) 33 and a serving MSC 34. A mobile station (MS) (not shown) belonging to a called subscriber is operating within the service area of the serving MSC 34.

A call origination 35 is first received in the originating MSC 31. The originating MSC 31 sends a Location Request (LocReq) Invoke message 36 to the HLR 32 and includes the digits dialed and a Transaction Capabilities (Transcap) parameter 61. The HLR 32 associates the digits dialed with a Mobile Identification Number (MIN) and includes the MIN in a Routing Request (RoutReq) Invoke message 37 sent to the VLR 33. The HLR also includes the Transcap parameter 61 in the RoutReq Invoke message. The Transcap parameter 61 includes an ANN bit which indicates to the serving system whether or not the originating system is capable of generating tones and announcements. When the ANN bit is set to one (1), the serving MSC 34 deduces that the originating MSC 31 is capable of generating tones and announcements. Alternatively, upon recognizing the absence of the Transcap parameter, the serving MSC 34 may consult an internal database where the announcement capability of the originating MSC is recorded. The database likewise records this capability for all possible originating systems that may send a RoutReq message to the serving system.

At 38, the VLR forwards the RoutReq Invoke message to the serving MSC 34. The serving MSC then sends a RoutReq Return Result message 39 to the VLR 33, and includes a Temporary Location Directory Number (TLDN). At 40, the VLR forwards the RoutReq Return Result message to the HLR 32. The HLR then sends a LocReq Return Result message 41 to the originating MSC 31 with instructions for call setup. At 42, a trunk is seized and the call is set up between the originating MSC 31 and the serving MSC 34.

At 43, it is determined that the called subscriber is not available, either because there was no page response from the called mobile station, or the called party did not answer when an alert signal was sent to the called mobile station. If the serving MSC 34 has determined either from the Transcap parameter or the MSC's internal database that the originating system is capable of supporting tones and announcements, the serving system sends a Redirection Request (RedReq) Invoke message 44 to the originating MSC 31 and includes the parameters Announcement List (Annlist) 62, Redirection Reason 63, Preferred Language 64, and Allow Transfer to Number 65. The Redirection Reason parameter 63 is a mandatory parameter in ANSI-41 (formerly IS-41C). The Annlist 62, Preferred Language 64, and Allow Transfer to Number 65 parameters are optional parameters added by the present invention. Only one or two of these optional parameters need be present for selected functionality of the present invention. Full functionality, however, requires that all three optional parameters be present in the RedReq Invoke message 44.

The Annlist parameter 62 requests that the originating system provide an announcement to the calling party and indirectly selects which announcement is to be played by providing to the originating MSC a diagnostic of the problem encountered at the serving MSC which is more detailed than the one provided via the standard Redirection Reason parameter. The Preferred Language parameter 64 is an existing parameter in ANSI-41. Its inclusion in the RedReq Invoke message 44 provides to the originating MSC an indication of the language which the called party prefers for the announcement to the calling party. If the originating MSC does not support the language indicated by the Preferred Language parameter, a default language of the originating system may be utilized for the announcement. The serving system is informed of the preferred language of the called subscriber when the mobile station registers in the serving system. The preferred language indicator is typically passed to the serving system in a Registration Notification (RegNot) message, but may also be passed in a Qualification Request (QualReq) Return Result message or a Qualification Directive (QualDir) Invoke message.

Alternatively, in the absence of a preferred language of the called party, the originating system may play the announcement in a default preferred language, or may utilize the preferred language of the calling party. The preferred language of the calling party may be obtained by the originating system through Integrated Services User Part (ISUP) signaling, or other known methods.

The Allow Transfer to Number parameter 65 provides to the originating MSC an indication that the originating MSC should request the service logic (e.g., HLR) for a transfer-to-number or for other services. The serving MSC is typically in a position to provide this indication since the serving MSC generally knows which features were subscribed to by the called subscriber. The serving MSC typically gets this information from the called mobile station's Registration Notification (Regnot) Return Result message.

The originating MSC acknowledges receipt of the RedReq Invoke message by returning a RedReq Return Result message 45 to the serving MSC 34. This is followed by call release 46 at which time the trunk from the originating system to the serving system is released. In this scenario, it is assumed that transfer-to numbers are disabled at the originating MSC. The originating MSC 31 then plays the announcement to the calling subscriber at 47 (optionally in the called party's preferred language), and releases the call at 48.

FIG. 2A is a message flow diagram of an alternative embodiment of the message flow illustrated in FIG. 2. In the alternative embodiment, the announcement is preferably made from the originating MSC 31, but may be made from the serving system if it is first determined that the originating system's announcement machines are congested. The message flow is identical through step 44 where the RedReq Invoke message 44 is sent from the serving MSC 34 to the originating MSC 31. Following the RedReq Invoke message 44, the originating MSC 31 checks the availability of announcement machines. If an announcement machine is available, the originating MSC acknowledges the RedReq Invoke message with the RedReq Return Result message 45 (FIG. 2), and plays the announcement as above. If, however, there is congestion, and an announcement machine is not available at 49, the originating MSC 31 returns a RedReq Return Result message 45A to the serving MSC 34 and includes an indication that an announcement machine is not available. The announcement 47A is then made from the serving MSC 34 prior to releasing the trunk at 46 and releasing the calling party at 48.

FIG. 3 is a message flow diagram illustrating the messages involved in call delivery invocation in a network that does not support page before routing, the called mobile station subscribes to services that require service logic, and no answer or no page response is received from the called mobile station, thereby generating an announcement to the calling party from the originating system in accordance with the teachings of the present invention. A radio telecommunications network 30 is shown to comprise an originating system having an originating MSC 31 and a Home Location Register (HLR) 32, and a serving system having a Visitor Location Register (VLR) 33 and a serving MSC 34. The mobile station (MS) (not shown) belonging to a called subscriber is operating within the service area of the serving MSC 34. It is known by the serving MSC 34 that the mobile station subscribes to services that require service logic support such as, for example, logic in the HLR 32 or a Service Control Point (SCP) (not shown).

A call origination 35 is first received in the originating MSC 31. The originating MSC 31 sends a Location Request (LocReq) Invoke message 36 to the HLR 32 and includes the digits dialed and the Transaction Capabilities (Transcap) parameter. The HLR 32 associates the digits dialed with a Mobile Identification Number (MIN) and includes the MIN in a Routing Request (RoutReq) Invoke message 37 sent to the VLR 33. The HLR also includes the Transcap parameter 61 in the RoutReq Invoke message. The Transcap parameter 61 includes an ANN bit which indicates to the serving system whether or not the originating system is capable of generating tones and announcements.

At 38, the VLR forwards the RoutReq Invoke message to the serving MSC 34. The serving MSC then sends a RoutReq Return Result message 39 to the VLR 33, and includes a Temporary Location Directory Number (TLDN). At 40, the VLR forwards the RoutReq Return Result message to the HLR 32. The HLR then sends a LocReq Return Result message 41 to the originating MSC 31 with instructions for call setup. At 42, a trunk is seized and the call is set up between the originating MSC 31 and the serving MSC 34.

At 43, it is determined that the called subscriber is not available, either because there was no page response from the called mobile station, or the called party did not answer when an alert signal was sent to the called mobile station. If the serving MSC 34 has determined from either the Transcap parameter or the MSC's internal database that the originating system is capable of supporting tones and announcements, the serving system sends a Redirection Request (RedReq) Invoke message 44 to the originating MSC 31 and includes the mandatory parameter Redirection Reason 63 and the optional parameters Annlist 62, Preferred Language 64, and Allow Transfer to Number 65. If the serving MSC knows that the mobile station subscribes to services that require service logic support, the serving MSC either does not set the Allow Transfer to Number (ATN) bit, or it does not include the Allow Transfer to Number parameter in the RedReq Invoke message 44 sent to the originating MSC 31.

Upon receipt of a RedReq Invoke message in which the Allow Transfer to Number (ATN) bit is not set, or the Allow Transfer to Number parameter is not included, the originating MSC 31 requests the service logic support by sending a Transfer to Number Request (Tranumreq) Invoke message 55 to the service logic (e.g., the HLR 32). The Tranumreq Invoke message includes the parameters Redirection Reason 63, Annlist 62, and Preferred Language 64. The Annlist and Preferred Language parameters are additions to the standard Tranumreq Invoke message as specified in ANSI-41. The service logic in the HLR then provides a new destination number which the HLR returns to the originating MSC in a Tranumreq Return Result message 56. As a result of the service logic being invoked, the HLR may also change the content of the Annlist parameter and include it in the Tranumreq Return Result message 56. The originating MSC 31 then acknowledges receipt of the RedReq Invoke message 44 by returning a RedReq Return Result message 57 to the serving MSC 34. This is followed by call release 58 at which time the trunk from the originating system to the serving system is released. The originating MSC 31 then plays an announcement to the calling subscriber at 59 stating the reason that the call is being redirected (for example, page or answer timeout). At 60, call setup is completed to the digits (destination) returned in the Tranumreq Return Result message 56.

FIG. 4 is a table of parameters for the RoutReq Invoke message 37 modified in accordance with the teachings of the present invention. The Transaction Capability parameter is included in the RoutReq Invoke message as an optional parameter when applicable.

FIG. 5 is a table illustrating the contents of the Transaction Capability parameter 61 of the RoutReq Invoke message 37 of FIG. 4. The Transaction Capability parameter 61 is also included in the Location Request (LocReq) Invoke message 36. A new information element, Announcement Capability (ANN) is added in octet 2, bit F of this existing parameter. The originating system sets this bit to zero (0) to indicate that the system is not capable of generating tones and announcements at the current time. The originating system sets this bit to one (1) to indicate that the system is capable of generating tones and announcements at the current time. The serving system assumes that the originating system is capable of supporting each message on a standard announcement list. However, the Transcap parameter does not identify whether the originating system is capable of supporting specific announcements. It identifies only that the originating system is capable of supporting tones and announcements. If the serving system requests a specific announcement, but that announcement is not supported by the originating system, the originating MSC either plays a default message or maps the announcements on the announcement list to the announcements that the system can support. The mapping may be accomplished, for example, through a mapping table.

FIG. 6 is a table of parameters for the RedReq Invoke message 44 modified in accordance with the teachings of the present invention. The serving MSC 34 includes the Announcement List parameter 62 in the RedReq Invoke message 44 as an optional parameter to request the originating MSC 31 to provide a tone or announcement to the calling subscriber. The serving MSC 34 also includes the Preferred Language parameter 64 and the Allow Transfer to Number parameter 65 in the RedReq Invoke message 44.

FIG. 7 is a table illustrating the contents of the Allow Transfer to Number parameter 65 of the Redirection Request Invoke message 44 of FIG. 6. The serving system sets this bit to one (1) to prevent the originating system from sending a Transfer to Number message to the HLR. The serving system sets this bit to zero (0) to allow the originating system to send a Transfer to Number message to the HLR.

FIG. 8 is a table of parameters for the Transfer to Number Request (Tranumreq) Invoke message 55 modified in accordance with the teachings of the present invention. The originating MSC 41 (FIG. 3) includes the Announcement List parameter 62 in the Tranumreq Invoke message 55 as an optional parameter to request the originating MSC 41 to provide a tone or announcement to the calling subscriber. The originating MSC 41 also includes the Preferred Language parameter 64 to provide to the originating MSC an indication of the language which the called party prefers for the announcement to the calling party. Additionally, the originating MSC 41 includes a MSC-ID (originating MSC) parameter 66.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a radio telecommunications network, a method of announcing to a calling party in an originating system that a called party in a serving system is not available, said method comprising the steps of:

sending a first message from said originating system to said serving system indicating that said originating system is capable of generating announcements;

determining in said serving system that said called party is not available;

sending a second message from said serving system to said originating system requesting the originating system to provide an announcement to the calling party; and sending the announcement from said originating system to said calling party announcing that the called party is not available.

2. The method of claim 1 further comprising, after the step of sending a first message from said originating system to said serving system indicating that said originating system is capable of generating announcements, the step of seizing a trunk from said originating system to said serving system.

3. The method of claim 2 further comprising, after the step of sending a second message from said serving system to said originating system requesting the originating system to provide an announcement to the calling party, the step of releasing said trunk.

4. The method of claim 1 wherein said step of sending a first message from said originating system to said serving system indicating that said originating system is capable of generating announcements includes the steps of:

sending in a Routing Request Invoke message, a parameter indicating the transaction capabilities of the originating system; and determining in the serving system, that the parameter in the Routing Request Invoke message indicates that said originating system is capable of generating announcements.

5. The method of claim 1 wherein said step of sending a first message from said originating system to said serving system indicating that said originating system is capable of generating announcements includes sending in a Routing Request Invoke message, an indication for said serving system to consult an internal database where information regarding the announcement capability of the originating system is stored.

6. The method of claim 1 wherein said step of sending a second message from said serving system to said originating system requesting the originating system to provide an announcement to the calling party includes sending, in a Redirection Request Invoke message, a parameter requesting the originating system to provide an announcement to the calling party.

7. The method of claim 6 wherein the step of sending a second message from said serving system to said originating system requesting the originating system to provide an announcement to the calling party includes the step of sending, in the Redirection Request Invoke message, a preferred language parameter from said serving system to said originating system, said preferred language parameter indicating a preferred language of said called party for said announcement.

8. The method of claim 7 wherein said step of sending the announcement from said originating system to said calling party includes sending the announcement utilizing said preferred language.

9. The method of claim 1 wherein said step of sending the announcement from said originating system to said calling party announcing that the called party is not available includes sending said announcement in a default language of said originating system.

10. The method of claim 1 wherein said step of sending said announcement in a default language of said originating system includes sending said announcement in a preferred language of the calling party.

11. The method of claim 6 further comprising, after the step of determining in said serving system that said called party is not available, the step of determining in said serving system whether the called party subscribes to services that require service logic support.

12. The method of claim 11 wherein said step of sending a second message from said serving system to said originating system also includes notifying said originating system whether transferring the call to another destination is allowed.

13. The method of claim 12 wherein said step of notifying said originating system whether transferring the call to another destination is allowed includes the step of sending, in the Redirection Request Invoke message, a parameter allowing the originating system to access service logic for support.

14. The method of claim 11 further comprising, before the step of sending the announcement from said originating system to said calling party, the steps of:

sending a third message from said originating system to service logic requesting service logic support; and sending a destination number from said service logic to said originating system.

15. In a radio telecommunications network, a method of announcing to a calling party in an originating system that a called party in a serving system is not available, said method comprising the steps of:

sending a first message from said originating system to said serving system indicating that said originating system is capable of generating announcements;

determining in said serving system that said called party is not available;

sending a second message from said serving system to said originating system requesting the originating system to provide an announcement to the calling party that the called party is not available;

determining in said originating system whether an announcement machine is available to send said announcement;

sending said announcement from said originating system to said calling party upon determining that an announcement machine is available in the originating system; and sending said announcement from said serving system to said calling party upon determining that an announcement machine is not available in the originating system.

16. The method of claim 15 further comprising, before the step of sending said announcement from said serving system to said calling party upon determining that an announcement machine is not available in the originating system, the step of sending a third message from said originating system to said serving system indicating that an announcement machine is not available in said originating system.

17. The method of claim 16 wherein said step of sending a third message from said originating system to said serving system indicating that an announcement machine is not available in said originating system includes sending in a Redirection Request Return Result message, a parameter indicating that an announcement machine is not available in said originating system.

18. In a radio telecommunications network, a method of passing a preferred language indicator from a serving system to an announcing system in an originating system, said method comprising the steps of:

sending a first message from said originating system to said serving system indicating that said originating system is capable of generating announcements;

determining in said serving system that a called party is not available;

sending a second message from said serving system to said originating system, said second message:

requesting the originating system to provide an announcement to a calling party; and passing a preferred language indicator to said originating system, said preferred language indicator indicating a preferred language of the called party for said announcement; and sending the announcement from said originating system utilizing said preferred language.

19. The method of claim 18 wherein the step of passing a preferred language indicator to said originating system includes the step of sending, in a Redirection Request Invoke message, a preferred language parameter from said serving system to said originating system, said preferred language parameter indicating a preferred language of said called party for said announcement.

20. The method of claim 18 further comprising, before the step of sending the announcement from said originating system utilizing said preferred language, the step of determining in said originating system whether said originating system supports the preferred language indicated.

21. The method of claim 20 further comprising the step of sending said announcement in a default language of said originating system, upon determining that the originating system does not support the preferred language indicated.

22. The method of claim 21 wherein said step of sending said announcement in a default language of said originating system includes sending said announcement in a preferred language of the calling party.

* * * * *